US 6,743,405 B1

(12) United States Patent
Siriwardane

(10) Patent No.: US 6,743,405 B1
(45) Date of Patent: Jun. 1, 2004

(54) LOW TEMPERATURE SORBENTS FOR REMOVAL OF SULFUR COMPOUNDS FROM FLUID FEED STREAMS

(75) Inventor: Ranjani Siriwardane, Morgantown, WV (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 38 days.

(21) Appl. No.: 10/138,404

(22) Filed: May 6, 2002

Related U.S. Application Data

(63) Continuation-in-part of application No. 09/409,070, filed on Sep. 30, 1999, now abandoned.

(51) Int. Cl.$^7$ ................................................. B01J 20/02
(52) U.S. Cl. ........................... 423/244.06; 423/244.01; 423/244.07; 423/244.08; 502/400; 502/405; 502/406; 502/407; 502/411; 502/415
(58) Field of Search ................................ 502/400, 405, 502/406, 407, 411, 415, 344, 343, 338, 345; 423/244.01, 244.06, 244.07, 244.08

(56) References Cited

U.S. PATENT DOCUMENTS

| 3,985,682 | A | * | 10/1976 | Cull et al. | ................... | 502/346 |
| 4,323,544 | A | * | 4/1982 | Magder | .................... | 423/239.1 |
| 4,567,308 | A | * | 1/1986 | Yoshida et al. | ............. | 585/375 |
| 4,822,764 | A | * | 4/1989 | Suzukamo et al. | ......... | 502/344 |
| 5,427,995 | A | * | 6/1995 | Ziebarth et al. | ............ | 502/411 |
| 5,703,003 | A | * | 12/1997 | Siriwardane | ................ | 502/400 |
| 5,914,292 | A | * | 6/1999 | Khare et al. | ................ | 502/406 |
| 5,972,835 | A | * | 10/1999 | Gupta | ........................ | 502/439 |
| 6,346,190 | B1 | * | 2/2002 | Khare | ........................ | 208/244 |
| 6,578,715 | B2 | * | 6/2003 | Scranton et al. | ............ | 210/505 |

FOREIGN PATENT DOCUMENTS

WO     WO 95/24962    *   9/1995

* cited by examiner

Primary Examiner—Kiley Stoner
Assistant Examiner—Christina Ildebrando
(74) Attorney, Agent, or Firm—Joy Alwan; Thomas G. Anderson; Paul A. Gottlieb

(57) ABSTRACT

A sorbent material is provided comprising a material reactive with sulfur, a binder unreactive with sulfur and an inert material, wherein the sorbent absorbs the sulfur at temperatures between 30 and 200° C. Sulfur absorption capacity as high as 22 weight percent has been observed with these materials.

9 Claims, 2 Drawing Sheets

FIG I

LOW TEMPERATURE SORBENTS FOR REMOVAL OF SULFUR COMPOUNDS FROM FLUID FEED STREAMS

CROSS-REFERENCE TO RELATED APPLICATION

This application is a continuation-in-part of U.S. Ser. No. 09/409,070 filed Sep. 30, 1999, now abandoned.

CONTRACTUAL ORIGIN OF THE INVENTION

The United States has rights in this invention pursuant to an employment relationship between the inventor and the United States Department of Energy.

FIELD OF THE INVENTION

This invention relates to the removal of contaminants from gas streams, and in particular this invention relates to the use of sorbents for removing sulfur from gas streams at low temperatures.

BACKGROUND OF THE INVENTION

Vapor-phase fuel streams are valuable commodities. Natural gas consists of methane, carbon monoxide, hydrogen gas, and ethane. Liquified Petroleum Gases (LPG) are distillation products from both natural gas and oil-production processes, and are comprised of methane, ethane, propane, isobutane, butane and pentane. Other gases suitable for fuel gas use are derived from processes related to coal-gasification and oil shale-production. However, before such fuel streams are utilized, contaminants must be removed, particularly when advanced power generation systems are involved.

Sulfur-containing compounds (e.g. $H_2S$ and $CS_2$) are the most typical contaminants in such fuel gas streams. Indeed, $H_2S$ concentrations may range from 100 grains/100 cubic feet in blue and carbureted water gas to several hundred grains per 100 cu. ft in coal and coke-oven gases. Refinery gases from sulfur crudes and natural gases from sulfur-bearing regions may contain $H_2S$ concentrations of several thousand grains per 100 cu. ft.

Removal of sulfur is necessary for both environmental reasons and also to protect the components (such as catalysts, fuel cells and turbines) of the power generation systems. Aside from power generation scenarios, certain chemical production processes also abhor sulfur in feed streams, for example, in natural gas-, ammonia-, oil-refining and petrochemical refining-processes. For example, approximately 14 percent of U.S. natural gas reserves contain sulfur in the form of hydrogen sulfide and at least 15 percent of the natural gas processed annually requires treatment to remove hydrogen sulfide.

In addition to hydrogen sulfide, sulfur-containing compounds such as mercaptans, organic sulfides, disulfides, thiophenes, thioesters, carbon oxysulfides, among others have to be removed from feed streams.

Some of the techniques for removing sulfur from feed-streams incorporates high temperature processes. For example, U.S. Pat. No. 4,089,809 assigned to the instant assignee, discloses a solid absorbent consisting of iron oxide supported on silica for removal of hydrogen sulfide from hot gaseous mixtures at temperatures between 538° C. (1000° F.) and 815° C. (1500° F.). A typical reaction process is as follows:

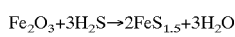

$$Fe_2O_3 + 3H_2S \rightarrow 2FeS_{1.5} + 3H_2O \qquad \text{Equation 1}$$

Aside from the high temperature requirements of this process, the efficacy of silicon oxide sorbents for the absorption of hydrogen sulfide is further dictated by chemical equilibrium constraints, for example when water vapor in the untreated gas (i.e., on the left side of the equation) is above a certain level.

Another relatively high temperature sorbent, this one containing zinc oxide, was disclosed in U.S. Pat. No. 4,088,736, issued to Courty et al. This patent discloses a zinc oxide sorbent supported on silica and/or alumina. The temperature range during the absorption step is 200° C. to 800° C., and more particularly between 300° C. and 650° C.

Zinc ferrite sorbents and a calcium-pretreatment process are utilized in a feed stream desulfurization procedure disclosed in U.S. Pat. No. 4,769,045 to Grindley. The zinc ferrite sorbent is prepared by mixing and calcining equimolar amounts of zinc oxide and iron oxide. The temperature range during the absorption step is about 538° C. to 649° C. At temperatures below 677° C., sulfur capture via calcium pretreatment is very minimal.

Zinc titanate sorbents have been developed to resist degradation at the high temperature—and highly reducing coal gas-environments concomitant with hot-gas environs. The use of zinc titanate sorbents as high temperature desulfurization sorbents is disclosed in U.S. Pat. Nos. 4,313,820 and 4,725,415, both assigned to Phillips Petroleum Company. Absorption and olefin hydrogenation have a temperature range of about 149° C. to 538° C. and hydrodesulfurization in the range of about 205° C. to 538° C.

U.S. Pat. No. 4,977,123 to Flytzani-Stephanopolous et al., discloses a method of making mixed metal oxide sorbents suitable for use in fixed bed reactors. The mixed metal oxide absorbents are prepared using calcined powders of a desired composition as starting materials, adding water to form a paste, extruding the paste, and drying and heating the extruded paste to yield the desired extrudate strength. The oxides may be oxide mixtures of various metals such as for example, copper, iron, aluminum, zinc, titanium, and mixtures thereof. Inorganic binder materials such as bentonite clay may also be added. The disclosed absorption temperature is 650° C.

The instant applicant, in U.S. Pat. No. 5,866,503, discloses the use of sorbent pellets for removing hydrogen sulfide in a coal gasification stream at temperatures at or above 260° C. (500° F.). Pellets are formed from a material reactive with hydrogen sulfide, a binder, and an inert material having a particle size substantially larger than the other components used to form the pellets. A diluent and a promoter may also be included during the formation process of the pellets.

Low temperature processes for removing sulfur from feed streams exist. Generally, however, these systems are low sulfur capacity processes. Some methods use wet processes operated within a liquid phase, typically an amine solution. These methods have the disadvantage of producing secondary waste streams such as contaminated waste water. Corrosion-, and solution loss-problems also exist with amine-type processing.

Activated carbon also is utilized in low-temperature sulfur removal processes. However, these systems have low capacities. And, the large carbon beds required are mostly non-regenerable, leading to secondary waste stream problems.

The Stretford process is another low-temperature approach for removing sulfur from feed streams. In the Stretford process, $H_2S$ gas is contacted with a scrubbing solution containing Vanadium in the +5 valence state and anthraquinone disulfonic acid (ADA) in a sodium carbonate solution at pH 9. The H$_2$S is absorbed in an acid/base reaction and the resultant bi-sulfide ion is oxidized by the V$^{+5}$ to produce elemental sulfur. V$^{+5}$ is reduced to V$^{+4}$ in this reaction but is regenerated using ADA and oxygen.

The Stretford process forms harmful substances and has very high capital costs. In addition, the process has not consistently achieved its design performance levels and has encountered many operating problems.

A need exists in the art for a solid sorbent to remove sulfur compounds at low temperatures. The sorbent should exhibit high sulfur capacity and be operable in the temperature range of between approximately 30° C. and 200° C. Furthermore, the sorbent should be relatively inexpensive to manufacture and maintain.

SUMMARY OF THE INVENTION

It is an object of the present invention to provide a sorbent for sulfur scavenging below 200° C. which overcomes many of the disadvantages of the prior art.

Another object of the present invention is to provide a sorbent that has an increased sulfur absorbing capacity between 30° C. and 200° C. A feature of the invention is the combination of readily available sulfur-reactive materials with diluent and support materials to produce a porous sulfur-absorbing substrate. An advantage of the present invention is that less materials are required in the reactor bed resulting in minimization of the reactor bed size and prolonged use of the bed. Another advantage is that the material is useful in low-temperature production processes, thereby resulting in minimal costs.

Yet another object of the present invention is to provide a sorbent suitable for both fixed/moving and fluidized bed reactor applications. A feature of the invention is that the sorbents are comprised of metal-containing oxide which is reactive with hydrogen sulfide metal at the temperature range of 30 to 200° C. An advantage of the sorbent is that it has excellent efficiency, and it can extract virtually all sulfur from the sulfur-containing feedstream so that near zero ppm levels of hydrogen sulfide concentrations in the feedstream are achieved.

Briefly, the invention provides material for absorbing sulfur, the material comprising a compound reactive with sulfur; an inert substance combined with the compound to create a mixture; and a binder to shape the mixture.

Also provided is a material for absorbing sulfur, the material comprising copper hydroxide; an inert material present at a weight percent of the material of approximately 7 to 12 percent; a binder material present at approximately 8 to 12 weight percent of the material; and a diluent material present at approximately 15 to 25 weight percent of the material.

Specifically, the invention provides a sorbent which is chemically and physically stable for use in sulfur removal processes at temperatures between 30° C. and 200° C., the sorbent comprising a material reactive with hydrogen sulfide, a binder unreactive with hydrogen sulfide, and inert diluents, wherein said material reactive with hydrogen sulfide is unreactive with all other components of said mixture.

BRIEF DESCRIPTION OF THE DRAWING

The invention together with the above and other objects and advantages will best be understood from the following detailed description of the preferred embodiment of the invention shown in the accompanying drawing, wherein.

DETAILED DESCRIPTION

Figure 1:
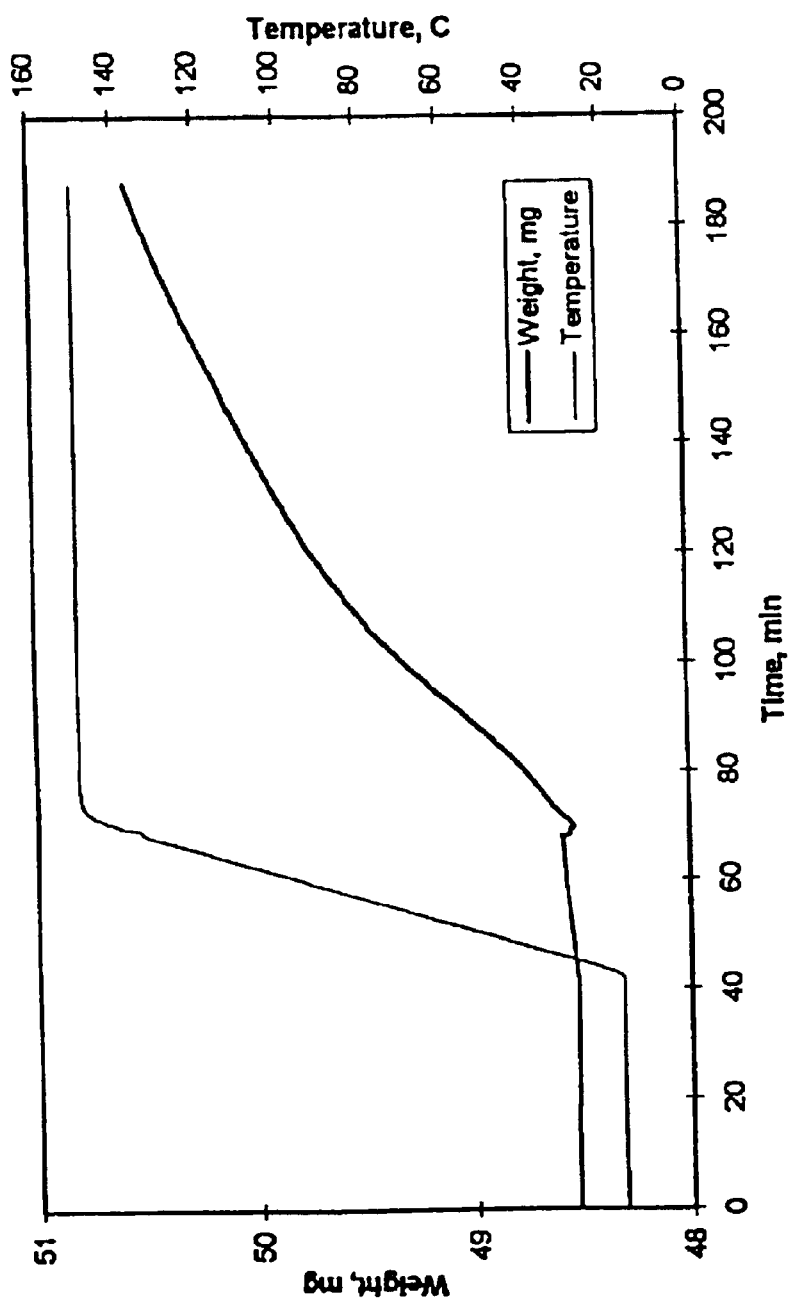
FIG. 1 is a graph showing sulfur uptake of exemplary sorbents, in accordance with features of the present invention.

The present invention discloses compounds exhibiting high sulfur absorbing capacity for temperatures in the range of 30° C. to 200° C. The invented materials have shown very high sulfur capacity (15–20 weight percent) when contacted with sulfur-containing streams having sulfur ppm concentrations as high as 1.2 percent (12,000 parts per million). Specifically, the invented sorbents are capable of adsorbing sulfur compounds from a gaseous feed of about 5 to 22 weight percent based on the weight of the sorbent in the above-stated temperature range.

The materials incorporated in the invented mixture are readily available and the method for preparing the pellets is very simple, therefore leading to cost-effective production. Also, the materials incorporated into the sorbent mixture are not hazardous and will not cause disposal problems. Since the sulfur capacity of the sorbent is very high, the amount of sorbent required in desulfurization processes is low; therefore the size of the reactor bed can be minimized. As noted supra, the invented sorbents can be utilized in fluidized/transport bed reactors or fixed bed reactors.

The invented sorbent can be utilized in a myriad of forms. For the sake of simplicity, pellets were formed from the invented sorbent and utilized to provide the data contained herein.

Chemically- and physically-stable sorbent pellets were utilized in sulfur removal processes in the temperature range of 30° C. to 200° C. Generally, the mixture comprises a material reactive with hydrogen sulfide, a diluent/support, and a binder unreactive with hydrogen sulfide.

Component ranges of the invented sorbent are as follows:

Reactive material: 30 to 70 percent by weight;

Inert diluent: 20 to 60 percent by weight; and

Binder: 2 to 45 percent by weight.

When sorbents are prepared utilizing impregnation of inert supports, reactive material concentration may vary from 5 to 60 wt %.

Preparation Detail

The sorbent material is being prepared by blending the reactive material (an exemplary material being copper hydroxide) with inert materials such as calcium sulfate or titanium dioxide, and a binder such as bentonite. The said mixture is mixed with water to produce a slurry and then either extruded or extruded/marumerized to make pellets with the desired shape. These materials can be spray dried or granulated to prepare sorbents suitable for fluidized bed/transport reactor applications. The sorbent pellets should be calcined to be converted to a usable form. The sorbents can also be prepared by impregnating inert materials with the said reactive materials.

Other sorbent preparation methods, well known in the art, can be utilized in the preparation of sorbents with the reactive materials described in the patent.

Pellets made up of the above components may be prepared by solid-state mixing and adding a sufficient amount of water to cause the pellets to agglomerate or adhere together. Mixer-pelletizer or compressing equipment and other methods of agglomera-tion known in the prior art may be used for this purpose. The agglomerated pellets are dried and calcined at an elevated temperature to convert them to durable form. Drying the pellets occurs in an oven at a temperature over 100° C. (212° F.) and preferably about 100° C. for approximately 7–10 hours. The dried pellets are then calcined at a temperature between 50° C. and 150° C. for less than nine (9) hours. At this calcination temperature and duration, the material reactive with hydrogen sulfide is unreactive with all other components of the mixture. If the sorbents were calcined at the temperatures of the prior art, the sorbent would be converted to metal oxides rather than hydroxides. Particularly, the copper hydroxide would be converted to copper oxide and the rubidium hydroxide would be converted to rubidium oxide. As shown in Table 1, copper oxide has a much lower sulfur capacity than copper hydroxide in the temperature range of 30–150° C. Similarly, rubidium oxide has a very low sulfur capacity.

The resulting pellets exhibit increased sulfur absorbing capacity in the temperature range of 30° C. to 200° C. compared to currently available commercial blends. The crush strength of the fresh pellets are in the range 3–4 lb per pellet and increases to 4–5 lb per pellet after sulfidation.

Hydrogen Sulfide—Reactive Material Detail

Reactive materials can be inorganic materials selected from the group consisting of copper hydroxide, copper (II) oxide, iron (III) hydroxide, potassium bicarbonate, rubidium hydroxide, zinc oxide, zinc oxide hydrate, lithium hydroxide, sodium peroxide, and mixtures thereof. These compounds are selected for their ability to react with hydrogen sulfide at the temperature range of about 50° C. to 200° C. Copper hydroxide is preferred for use over its effective temperature range of about 50° C. to 200° C. For operation between 30° C. and 50° C., rubidium hydroxide or lithium hydroxide may be employed. It should be noted that the reactive metal salts of the compounds, such as the acetates, formates, carbonates and nitrates can be used instead of the oxides inasmuch as the oxides can be derived from the salts.

Generally, the reactive compound will contain a metal selected from the group consisting of copper, iron, potassium, rubidium, zinc, lithium, sodium, or combinations thereof. The reactive material reacts with the sulfur via the following reaction mechanism:

$$2MOH + H_2S \rightarrow M_2S + 2H_2O \qquad \text{Equation 2}$$

wherein MOH is a metal hydroxide, and MS is the salt formed with the sulfur.

Inert Material Detail

Inert material utilized in the invented composition can be homogenous in structure, or comprise a plurality of various grain sizes. In a preferred composition, the inert material is comprised of a first diluent portion and a second portion.

The first inert portion (i.e. diluent) provides stability to the composition inasmuch as it does not enter into the reaction with hydrogen sulfide or otherwise alter during the reaction period. The diluent inert material may be selected from a group consisting of titanium oxide, titanium dioxide, calcium sulfate, calcium phosphate, calcium silicate, magnesium sulfate, zinc silicate, zinc aluminate, and alumino silicates. It is used at a concentration of 0 to 40 weight percent of the pellets and preferably 10 to 30 percent. In preparing pellets containing the diluent inert material, temperatures high enough to cause a reaction between this material and the reactive hydroxide are to be avoided to prevent loss of reactivity. Calcium sulfate and titania are preferred material for this component.

The second portion of the inert material contains large particles so as to obtain necessary porosity in the pellets. This compares with the reactive component portion of the sorbent which have relatively smaller particle sizes for maximum reactivity, strength, and optimum formation of voids around the larger inert particles.

Particle sizes of the second portion of the inert material may be varied, depend-ing on the desired pellet sizes for different types of reactor systems. For fixed/moving bed reactors, spherical or cylindrical pellets over 1 millimeter (mm) in size, and typically 2 to 5 mm, are used. For pellets of this size, particle sizes of the second portion of the inert component with large particle size may be over 50 microns and preferably 75 to 700 microns (25 to 200 mesh). Fluidized bed/transport reactors employ pellets under 500 microns, and the second portion of the inert component with large particle size for this pellet size could be sized under 150 microns, preferably 0.5 to 5 microns.

The second portion inert material containing larger particles for use in the pellets may be selected from the group consisting of silica gel, silica, alumina, alumina gel, titania gel, calcium sulfate, zinc silicate, zinc aluminate, and sand. Silica gel or calcium sulfate are preferred.

As noted supra, the second portion of the inert material may incorporate material with varying particle sizes, but at least two (2) weight percent of the particles should be made up of particles approximately twice as large as the reactive material. Preferably between 2 and 30 weight percent of the total inert material (i.e., the first and second portions combined) should be comprised of particles twice as large as the reactive material. Up to 40 percent of the second portion of the inert material could be particles twice in size compared to the size of the particles comprising the reactive compound.

The inert material may be provided in the pellets at a total concentration of 0 to 20 weight percent and more preferably at 2 to 10 weight percent. Other components of the pellets become loosely packed around the larger particles of this inert material, creating better porosity in the pellets. Upon being subjected to exposure at higher temperatures in preparation or operation, the large particle size inert material undergoes a decrease in surface area, but porosity of the pellets is increased due to creation of additional voids around the large particles.

Binder Detail

A binder is required in the pellets to keep them together. The binder may comprise inorganic or organic materials or a mixture thereof. For example, suitable inorganic materials include, but are not limited to, kaolinite, other alumino silicates, calcium sulfate, cement, or mixtures of these materials.

Organic binders that can be used include substances selected from the group consisting of hydroxypropyl methyl cellulose, molasses, starch, polyvinyl acetate, cellulose, hydropropyl cellulose, lignin sulfonate, and mixtures thereof.

Concentration of the binder in the pellets may range from 2 to 60 weight percent.

It is noted that calcium sulfate is included within the listing of materials for both the first and second inert materials as well as for the binder.

The binder facilitates shaping the sorbent material into a desired shape, such as pellets, spheres, rods, or other configuration to maximize sorbent contact with the sulfur laden fluid to be treated.

The invention is illustrated by the following examples.

TGA Data with Powdered Reactive Materials

Extent of sulfur uptake by the powder was determined using a TA Instruments 951 Thermogravimetric Analyzer (TGA-2050 TA Instruments). Approximately 25–50 mg of sample was utilized for each test. Sulfur-containing gases were introduced at 90 cc.min at the desired sample temperature. Tests were conducted with sulfur gases in the presence of both reducing gases and non-reducing gases. The composition of the sulfur containing reducing gas mixture was 0.4% $H_2S$, 51.9% $H_2$, 22% $CO_2$, 1.67% $CH_4$ and 24% $N_2$, while the composition of the sulfur-containing non-reducing gas mixture was 1.28% $H_2S$ in nitrogen or argon.

In the TGA experiments, weight gains of the pellet is measured after introduction of the gas. The amount of sulfur uptake by a solid material is usually calculated utilizing the weight gain. A typical TGA curve for copper (II) oxide is depicted in FIG. 1. When secondary reactions do not occur during sulfur sorption, the weight gain in TGA is directly proportional to the sulfur uptake. However, when secondary reactions take place, the weight gain is not directly related to the weight gain and the solid is analyzed using a sulfur analyzer to determine the actual sulfur uptake after the TGA experiments. The analyzer is the SC432DR™ model manufactured by LECO Corp. of St. Joseph, Mich.

Sulfur uptake values (after exposure to $H_2S$ in reducing gas) determined by the TGA/LECO experiments are listed in Tables 1 and 2, below, for reducing and non-reducing gas, respectively.

Compared to commercially-available materials, many of the invented sorbents showed exceptional sulfur uptake, 16–22 weight percent, in the temperature range of 50° C. to 200° C. Both rubidium and lithium hydroxide showed reasonable sulfur capacity, even at 30° C. These results are superior to those obtained from commercial sorbents, such as molecular sieves, carbon-containing industrial sorbents, and the commercial solvent methyl diethyl amine (MDEA). As such, all ten of the invented sorbents provide superior sulfur absorption compared to commercially-available compositions. The LECO/TGA sulfur uptake values after exposure to $H_2S$ in non-reducing gases (Argon or nitrogen) are listed in Table 2.

TABLE 1

Sulfur Loading Values Obtained from TGA/LECO Analysis with $H_2S$ in Reducing Gas

| Compound | Sulfur Uptake (Weight Percent) | | | | |
|---|---|---|---|---|---|
| | 200° C. | 150° C. | 100° C. | 50° C. | 30° C. |
| Copper Hydroxide | 19.3 | 22.0 | 19.1 | 16.8 | 5.6 |
| Copper II Oxide | 17.6 | 12.1 | 3.3 | 0.3 | 0.2 |
| Iron III Hydroxide | 17.6 | 3.8 | 2.2 | 1.7 | 1.4 |
| Potassium Bicarbonate | 19.9 | 6.4 | 0.01 | 0.01 | <0.01 |
| Rubidium Hydroxide | 6.1 | 4.7 | 6.6 | 5.1 | 7.5 |
| Zinc Oxide | 7.7 | 5.6 | 4.1 | 2.8 | 2.6 |
| Zinc Oxide Hydrate | 5.5 | 2.9 | 1.6 | 1.2 | 0.9 |
| Lithium Hydroxide | 3.7 | 0.3 | 0.5 | 8.4 | 6.9 |
| Sodium Peroxide | 4.9 | 6.2 | 9.2 | 3.3 | 4.2 |
| Ferric Oxide | 4.3 | 1.5 | 1.2 | 1.0 | 0.2 |

COMMERCIALLY-AVAILABLE SORBENTS:

| | |
|---|---|
| Activated Carbon | 3.04% and 2.79% at 30° C.. |
| MDEA solvent | 0.001–2.17 moles/mole (or 2.85 × $10^{-4}$ to 0.62 wt %) at 40–65° C.. |
| Molecular Sieve 5A | 0.03–0.21 weight percent at 30–200° C.. |

The inventors found that most of the sorbents had a higher sulfur capacity in the presence of reducing gas but rubidium hydroxide seems to perform better in the presence of non-reducing gas. The powdered materials also were tested with 1 percent carbonyl sulfide in nitrogen at both 50 and 150° C. Copper hydroxide had a sulfur uptake of 5.5 weight percent and lithium hydroxide had a sulfur uptake of 1.7 weight percent at 150° C. but showed a lower sulfur uptake at 50° C. (copper hydroxide—0.9 wt % and lithium hydroxide at <0.01 wt %). This indicates that these two compounds are suitable for absorption of carbonyl sulfide at 150° C.

TABLE 2

Measured Sulfur-Uptake Values After Exposure to $H_2S$ in Non-Reducing Gas.

| Compound | Total Sulfur Uptake (Weight %) | | | | |
|---|---|---|---|---|---|
| | 200° C. | 150° C. | 100° C. | 50° C. | 30° C. |
| Copper Hydroxide | 16.8 | 15.4 | 14.6 | 10.3 | 5.1 |
| Rubidium Hydroxide | 13.4 | 13.6 | — | 5.0 | — |
| Iron Hydroxide | 8.4 | — | 1.8 | — | — |
| Copper Hydroxide | 8.7 | 8.3 | — | — | — |

When these materials were tested with tetrahydro thiophene (180 ppm) in nitrogen at both 50° C. and 150° C., the sulfur uptake values were very low with lithium hydroxide showing the highest absorption of 0.85 wt % at 50° C. Lithium hydroxide also had a sulfur uptake of 0.67 wt % and 0.79 wt % at 50° C. and 150° C. respectively when it was exposed to dimethyl sulfide (1500 ppm) in nitrogen. Copper hydroxide had a sulfur uptake of 0.22 and 0.60 wt % at 50° C. and 150° C. respectively when it was exposed to dimethyl sulfide.

Test Results with Pelletized Sorbent

A pelletized sorbent structure was constructed with the following general formulation: copper hydroxide present at between 60 and 65 weight percent; an inert material present at a weight percent of the material of approximately 7 to 12 percent; a binder material present at approximately 8 to 12 weight percent of the material; and a diluent material present at approximately 15 to 25 weight percent of the material.

Specific sorbent pellets were prepared using the following composition:

| | |
|---|---|
| Copper Hydroxide | 550 grams |
| Silica Gel | 37.5 grams (35–60 mesh) |
| Silica Gel | 37.5 grams (100–200 mesh) |
| Bentonite | 90 grams |
| Titanium dioxide | 170 grams |

The powders were mixed with a sufficient amount of water, extruded and marumerized (spherical) to obtain pellets having an average diameter of 3 mm. The pellets were calcined at 100° C. for eight hours.

These sorbent pellets were tested in the TGA at 150° C. with hydrogen sulfide in reducing gas. The measured (LECO) sulfur uptake of the solid was 15 weight percent. These results indicate that the sulfur capacity for the sorbent pellets was superior to typical sorbents. Typical sorbents have sulfur capacity less than 3 weight percent, as shown in Table 1.

Figure 2:
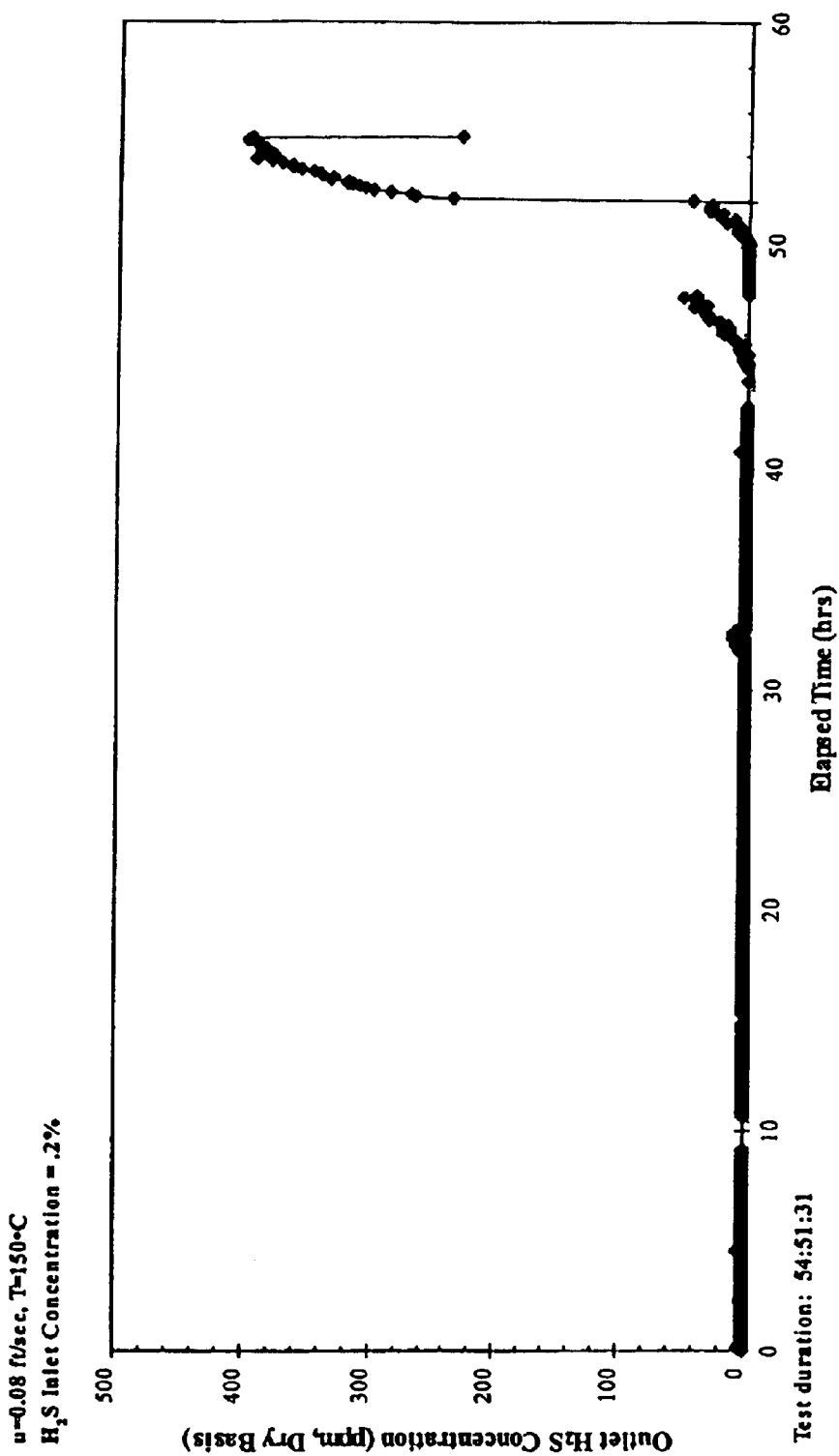
FIG. 2 is a graph showing exit sulfur concentrations of sulfur in streams treated with the invented sorbent, in accordance with features of the present invention.

The sorbent pellets were also tested in an atmospheric fixed bed bench scale reactor. The reactor bed had a 6 inch bed height and 2 inch diameter. The inlet hydrogen sulfide concentration was 2000 ppm in nitrogen. The gas was introduced to the reactor at a space velocity of 1000 hr$^{-1}$. The temperature of the reactor bed was maintained at 150° C. The outlet hydrogen sulfide concentration measured as a function of time is shown in FIG. 2. The outlet hydrogen sulfide concentration was near zero ppm during the first 40 hours of testing. At approximately 45 hours after testing began, sulfide concentration of the outlet gas begins to increase, thereby indicating saturation of the sorbent. This indicates that the sorbent has a very high efficiency and is capable of reducing the sulfur level from 2000 ppm to near zero ppm.

While the invention has been described with reference to details of the illustrated embodiment, these details are not intended to limit the scope of the invention as defined in the appended claims. For example, the sorbent can comprise a compound reactive to sulfur, wherein the compound is impregnated onto, into or otherwise reversibly adhered to inert porous substrates to form reactant sorbents. These porous substrates can be large granular materials selected from the group consisting of titania, silica, alumina, alumino silicate, zirconia, zeolites, carbon, or combinations thereof. These porous substrates can range in size from 100 microns to 3–4 millimeters.

The embodiment of the invention in which an exclusive property or privilege is claimed is defined as follows:

1. A material for removing hydrogen sulfide from a gas stream, the material comprising:
    a) a compound reactive with hydrogen sulfide at between 30° and 200° C., the reactive material selected from the group consisting of iron (III) hydroxide, potassium bicarbonate, rubidium hydroxide, zinc oxide hydrate, lithium hydroxide, sodium peroxide, and combinations thereof, said reactive material calcined at temperatures below 150° C. and reactive with hydrogen sulfide at between 30° and 200° C.;
    b) the reactive compound having a weight percent range of 30–70%;
    c) a first inert diluent selected from a group consisting of titanium oxide, calcium sulfate, calcium phosphate, calcium silicate, magnesium sulfate, zinc silicate, zinc aluminate, and alumino silicate and combinations thereof;
    d) a second inert diluent having a particle size at least twice that of the reactive compound selected from a group consisting of silica, silica gel, alumina, alumina gel, sand, and calcium sulfate and combinations thereof;
    e) the first and second diluents having a weight percent range of 10–30% of the material;
    f) a binder unreactive with hydrogen sulfide selected from a group consisting of bentonite, kaolinite, cement, hydroxypropylmethyl cellulose, molasses, starch, polyvinyl acetate, cellulose, hydroxy cellulose, lignin sulfonate, and combinations thereof; and
    g) the binder having a weight percent range of 2–60%.

2. The material as recited in claim 1 wherein the second inert diluent is approximately 100 microns to 4 millimeters in size.

3. A method for producing a sorbent capable of removing hydrogen sulfide from a gas stream at temperatures ranging from 30° C. to 200° C., the method comprising:
    a) combining a sulfur reactive compound selected from the group consisting of iron (III) hydroxide, potassium bicarbonate, rubidium hydroxide, zinc oxide hydrate, lithium hydroxide, sodium peroxide, and ferric oxide with a first and second inert material and a binder to create a homogenous mixture;
    b) pelletizing the mixture; and
    c) calcining the pelletized mixture at a temperature range between about 50° C. and 150° C.

4. The method as recited in claim 3 wherein the second inert material is a granular substrate selected from the group consisting of silica gel, silica, alumina, alumina gel, calcium sulfate, zinc aluminate, sand or combinations thereof.

5. The method as recited in claim 3 wherein approximately 2 to 30 weight percent of the inert material has particles twice as large as particles comprising the compound.

6. The method as recited in claim 3 wherein the compound comprises between 30 to 70 weight percent of the sorbent.

7. The method as recited in claim 3 wherein the first inert material is selected from the group consisting of titanium oxide, calcium sulfate, calcium phosphate, calcium silicate, magnesium sulfate, zinc silicate, zinc aluminate, and alumino silicate and combinations thereof.

8. The method as recited in claim 3 wherein the binder is selected from the group consisting of bentonite, kaolinite, cement, hydroxypropylmethyl cellulose, molasses, starch, polyvinyl acetate, cellulose, hydroxy cellulose, lignin sulfonate, and combinations thereof.

9. A method for removing hydrogen sulfide from a gas stream comprising:
    a) contacting the gas stream with the sorbent according to claim 1 at between 300 and 200° C.; and
    b) removing the hydrogen sulfide.

* * * * *